United States Patent
Borden et al.

(10) Patent No.: US 9,863,203 B2
(45) Date of Patent: Jan. 9, 2018

(54) ELASTOMERIC SEAL FOR ROTATING HEADS

(75) Inventors: Kelly Borden, Alberta (CA); Trevor Fritz, Nisku (CA)

(73) Assignee: HITEK URETHANE GLOBAL LTD., Nisku (CA)

( * ) Notice: Subject to any disclaimer, the term of this patent is extended or adjusted under 35 U.S.C. 154(b) by 452 days.

(21) Appl. No.: 13/086,875

(22) Filed: Apr. 14, 2011

(65) Prior Publication Data

US 2012/0261888 A1 Oct. 18, 2012
US 2016/0177650 A9 Jun. 23, 2016

(30) Foreign Application Priority Data

Mar. 23, 2011 (CA) ..................................... 2734901

(51) Int. Cl.

| | | |
|---|---|---|
| *F16J 15/32* | (2016.01) | |
| *E21B 33/038* | (2006.01) | |
| *E21B 33/08* | (2006.01) | |
| *F16J 15/3204* | (2016.01) | |
| *F16J 15/3252* | (2016.01) | |
| *F16J 15/3284* | (2016.01) | |
| *E21B 33/00* | (2006.01) | |

(52) U.S. Cl.
CPC .......... *E21B 33/038* (2013.01); *E21B 33/085* (2013.01); *F16J 15/3204* (2013.01); *F16J 15/3252* (2013.01); *F16J 15/3284* (2013.01); *E21B 2033/005* (2013.01)

(58) Field of Classification Search
CPC ...... F16J 15/104; F16J 15/061; F16J 15/3204; F16J 15/3252; F16J 15/3284; F15J 15/122; E21B 33/085; B21B 33/038; B21B 33/085; B21B 2033/005
USPC .......................... 277/650, 652, 626, 627, 562
See application file for complete search history.

(56) References Cited

U.S. PATENT DOCUMENTS

| | | | | |
|---|---|---|---|---|
| 2,336,090 A * | 12/1943 | Granger | .................. | E21B 37/10 92/241 |
| 5,997,009 A * | 12/1999 | Geise | ............................ | 277/650 |
| 6,547,668 B2 * | 4/2003 | Kopp | .................... | F16C 21/005 277/615 |
| 7,055,593 B2 * | 6/2006 | Lappin | .................... | E21B 33/08 166/84.1 |
| 7,261,153 B2 * | 8/2007 | Plomp | ........................... | 166/202 |
| 7,591,450 B1 * | 9/2009 | Blume | ......................... | 251/332 |
| 7,959,155 B2 * | 6/2011 | Templeton et al. | ........... | 277/335 |
| 8,312,805 B1 * | 11/2012 | Blume | ............................ | 92/240 |
| 2005/0133218 A1 * | 6/2005 | Plomp | ........................... | 166/202 |
| 2009/0194947 A1 * | 8/2009 | Templeton | ............. | E21B 33/126 277/335 |

* cited by examiner

*Primary Examiner* — Nathan Cumar
(74) *Attorney, Agent, or Firm* — Bennett Jones LLP

(57) ABSTRACT

An all-elastomeric sealing element for a rotating control device includes a base portion, a conical portion and has a central pipe opening through both the base portion and the conical section. The conical section has an elastomeric core layer and an elastomeric surface sealing layer which encases the core layer. The surface sealing layer is softer than the core layer, as measured on a standard durometer scale.

12 Claims, 5 Drawing Sheets

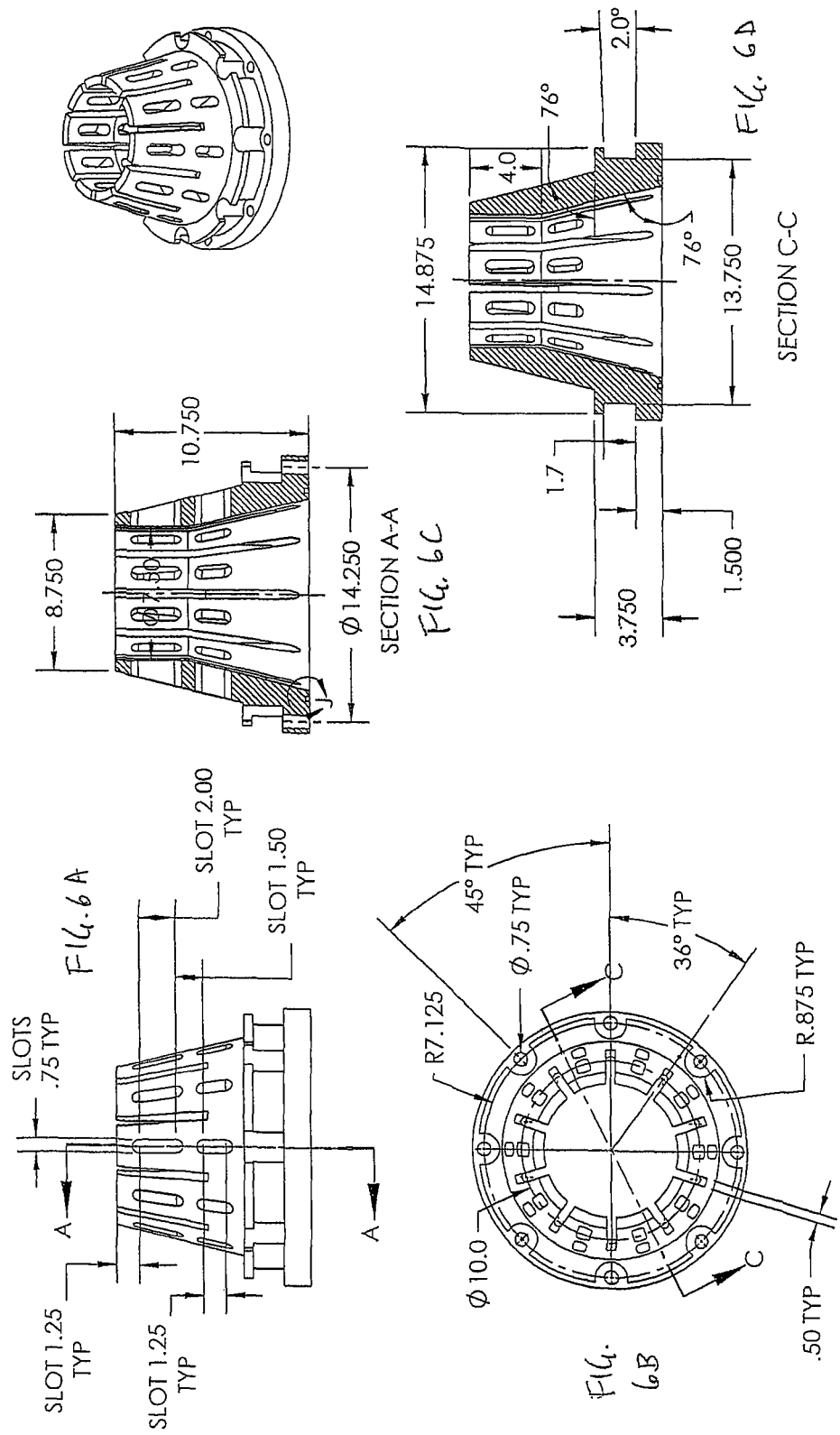

ELASTOMERIC SEAL FOR ROTATING HEADS

FIELD OF THE INVENTION

The present invention relates to an elastomeric sealing element for rotating control devices.

BACKGROUND

Rotating control devices (RCDs) are used to isolate the annulus, contain annular fluids under pressure, and divert returns to pressure control and fluid management systems. RCDs connect to the top of the blowout preventer (BOP) in the wellhead, and allow rotary drilling and stripping out of a well with positive annular pressure. All RCDs include a sealing element which forms either a passive or active pressure seal around the drill pipe. The RCD is an important element in every managed pressure drilling and underbalanced drilling operation because neither application is possible without one.

The seal element must be flexible enough to allow pipe joints to pass through the RCD while maintaining a seal around the drill pipe. Conventionally, elastomeric seals such as rubber or polyurethane seals are used, which provide the needed flexibility. The seals conventionally have a steel core or frame which provides strength and rigidity.

Improvements in sealing performance will improve the function of RCDs, such as when used in managed pressure and underbalanced drilling.

SUMMARY OF THE INVENTION

The present invention relates to a sealing element for a rotating control device. In one aspect, the invention may comprise an elastomeric seal, said seal comprising a base portion, a conical portion and defining a central pipe opening through both the base portion and the conical section, wherein the conical section comprises an elastomeric core layer and an elastomeric surface sealing layer which encases the core layer, and wherein the surface sealing layer is softer than the core layer, as measured on a standard durometer scale.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIGS. 6A-6G show various views of one embodiment of a core layer, showing various dimensions, and are substantially to scale.

DETAILED DESCRIPTION OF PREFERRED EMBODIMENTS

The present invention relates to an elastomeric seal for a rotating control device. Any term or expression not expressly defined herein shall have its commonly accepted definition understood by those skilled in the art. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Figure 1:
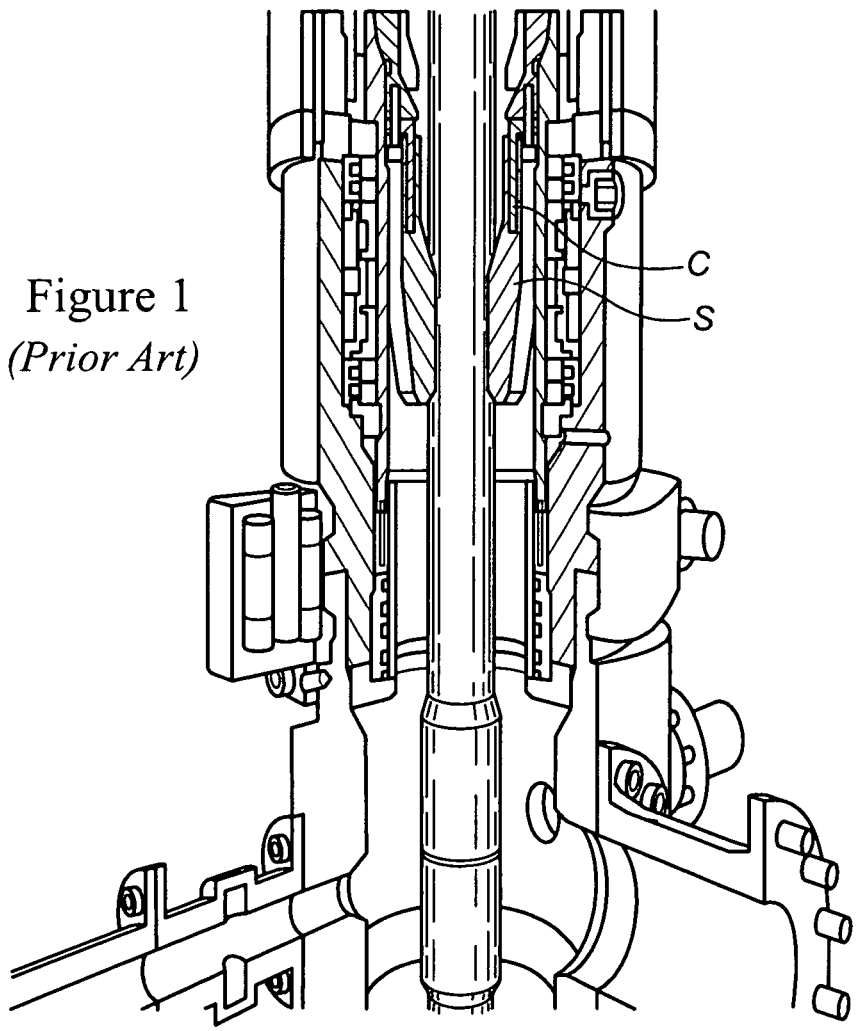
FIG. 1 (prior art) shows a rotating head in cross section with a prior art seal (S) in place.
Figure 2:
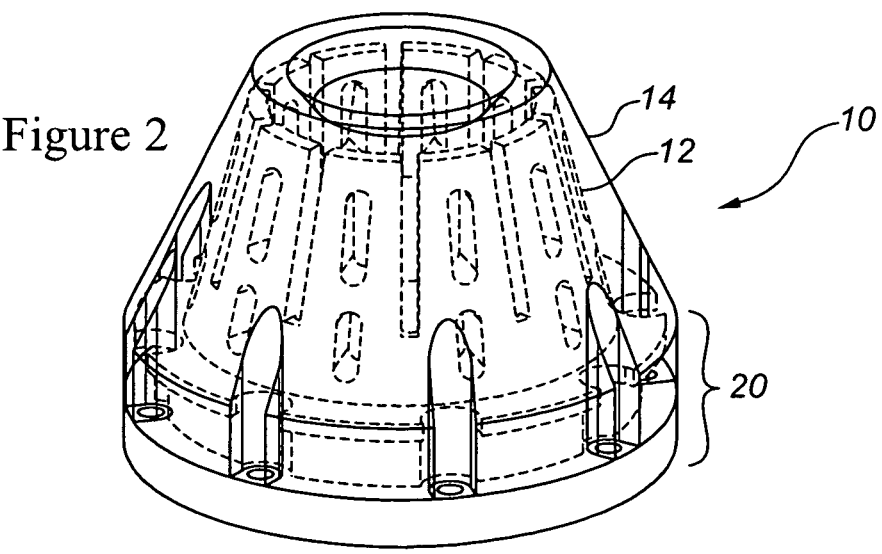
FIG. 2 shows one embodiment of a seal of the present invention, showing the outer sealing layer in phantom, and the core layer.
Figure 3:
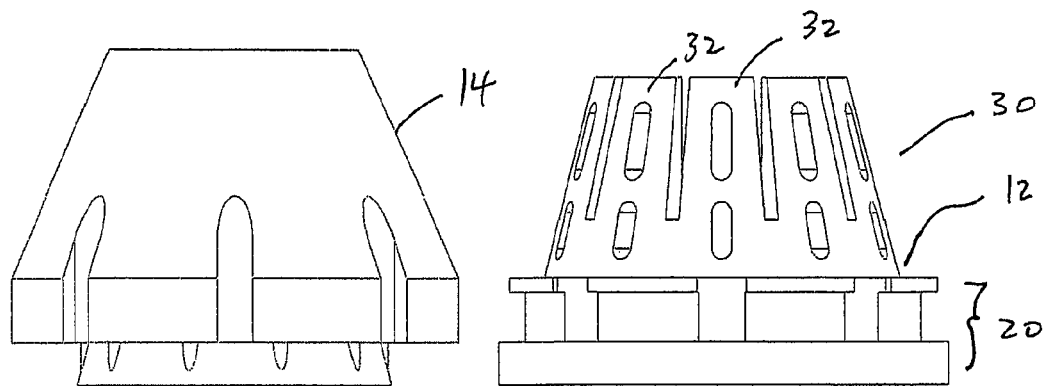
FIG. 3 shows a side elevation view of the surface sealing layer and the core layer.
Figure 4:
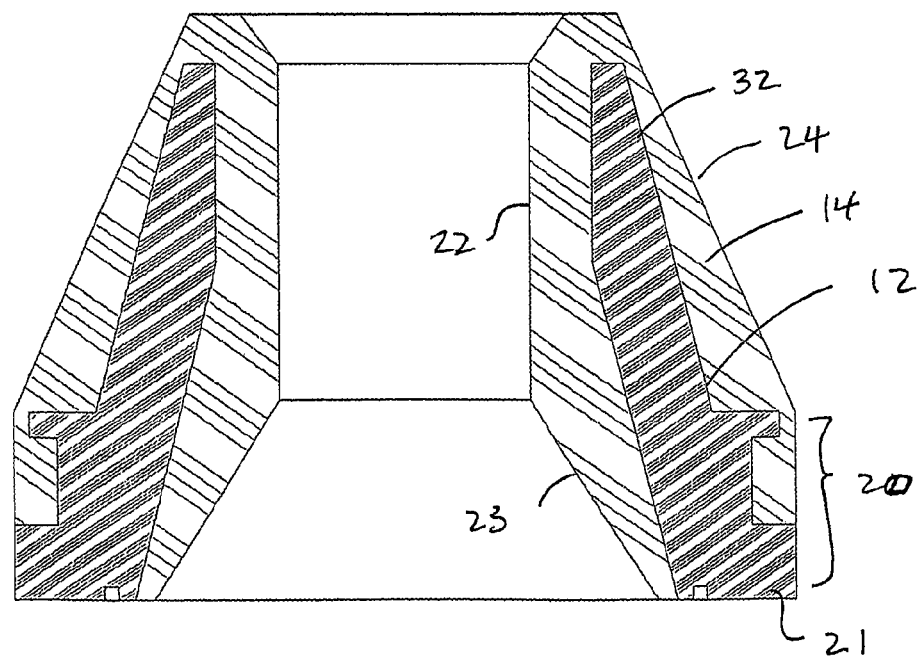
FIG. 4 shows a cross section of the seal through the length of the finger projections.
Figure 5:
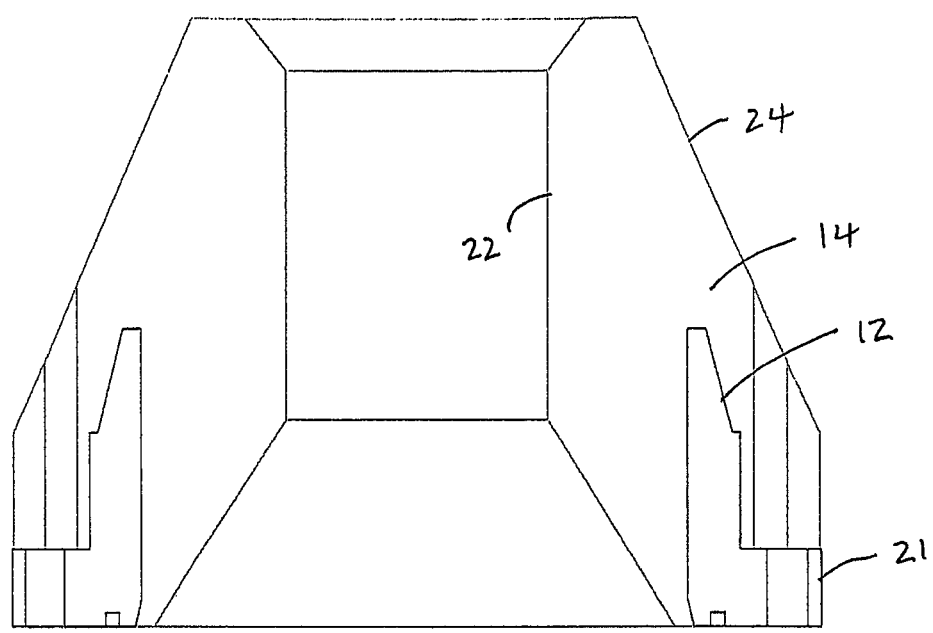
FIG. 5 shows a cross section of the seal though the gap separating two adjacent finger projections.
Figure 6G:
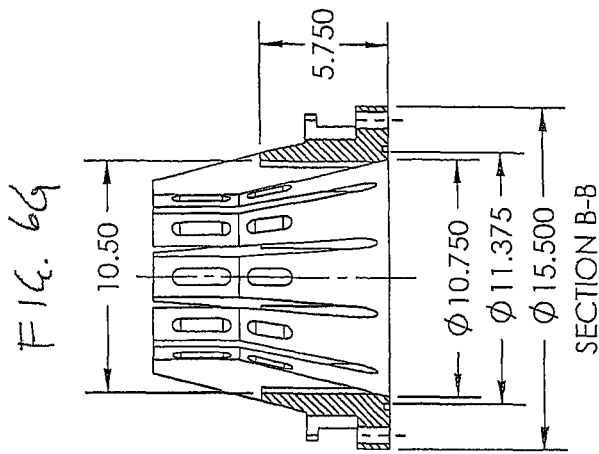
Figure 6F:
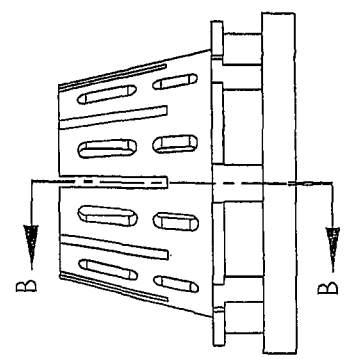
Figure 6E:
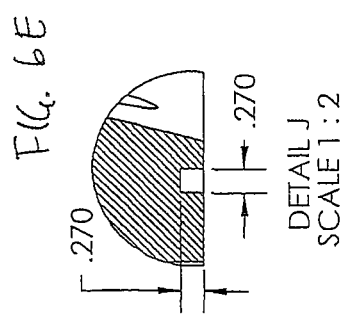

FIG. 1 shows a prior art seal (S) installed into a Schlumberger Enseal Optimal™ rotating head. The steel core (C) which is ubiquitous in prior art seals is shown. It may be seen that the steel core (C) does not extend very far along the length of the seal, and steel is of course a non-elastic material. The all-elastomeric seals of the present invention may be configured to replace existing seals on any configuration of a rotating head from any manufacturer.

As used herein, an "elastomer" is a material which has the property of elasticity. Elastomers typically have low Young's modulus and high yield strain. Elastomers may include saturated and unsaturated rubber, and thermoplastic elastomers. Thermoplastic elastomers may include styrenic block copolymers, polyolefins, polyurethanes, polyesters and polyamides.

In one embodiment, the elastomeric seal is configured to provide reasonable flexibility and sealing ability by a combination of different elastomeric layers having differing hardnesses. In one embodiment, a core layer is provided which provides strength and rigidity to the seal, but which is itself elastic. Preferably, but not essentially, the core layer is configured with finger portions to provide rigidity and strength, while retaining flexibility. The core layer is covered by a softer elastomer, which provides the flexibility essential for good sealing performance.

An exemplary seal (10) is comprised of an elastomeric core (12) encased in a surface sealing layer (14). The sealing layer (14) is formed from an elastomeric material which is softer than the core (12) material. In one embodiment, the core material has a hardness of between about 60 to 90 on the Shore D durometer scale, preferably in the range of about 70 to 80. In one embodiment, the core material has a hardness of about 75 on the Shore D scale. The sealing layer may be formed of an elastomeric material having a hardness of between about 60 to 100 on the Shore A durometer scale, preferably between about 70 to about 90, more preferably between about 75 to about 85. In one exemplary embodiment, the sealing layer has a hardness of 82 Shore A.

There are known empirical and semi-empirical relationships between Shore hardness and Young's modulus. In one embodiment, the hardness of the components of the present invention may be expressed in terms of Young's modulus, having regard to any known formula equating Shore hardness and Young's modulus in MPa.

The core layer (12) provides some rigidity and strength to the seal, while the softer surface layer improves the sealing ability without sacrificing too much strength. In one embodiment, the core layer comprises polyurethane having a Shore D hardness of about 75. In one embodiment, the surface sealing layer comprises polyurethane having a Shore A hardness of about 82. Preferably the sealing layer (14) is formed of a material having a relatively low coefficient of friction with pipe, which will facilitate the passage of pipe through the seal in operation. The surface sealing layer may be cast to encase the core layer, using conventional polyurethane casting methods.

The seal (10) comprises a substantially conical shape in its undeformed state, having a base portion (20), an inner sealing surface (22) which is substantially cylindrical, and an outer surface (24). The upper area of the inner sealing surface is preferably beveled, creating a conical inner surface (23), to facilitate entry of larger diameter portions of the pipe string. As will be appreciated by those skilled in the art, fluid pressure will act on the outer surface (24), causing the inner sealing surface (22) to press against the pipe and create an effective seal. When a pipe joint passes through the seal, the seal must expand to accommodate the larger diameter of the pipe joint, but retain its intimate contact with the pipe in order to maintain the seal.

The base portion (20) is preferably integral with the core layer (12) and formed of the same relatively harder material. The base portion comprises a flange (21) defining mounting holes (26) for bolting the seal into position. In one embodiment, the conical portion (30) of the core comprises a plurality of separate finger portions (32) separated by relatively narrow gaps. In alternative embodiments, the core layer may be unitary, without finger-like projections. In one embodiment, the number of finger portions may vary between about 2 to about 12 or more. In one specific embodiment, the core comprises 10 finger portions (32), equally spaced with uniform narrow gaps, as is shown in the Figures.

In use, the core layer (12) imparts some rigidity to the conical portion of the seal, and improves the sealing performance of the inner sealing surface by resisting deformation of the seal, because the core layer is formed from a relatively harder material. At the same time, because the core layer is elastomeric, the conical portion of the seal can still expand, allowing the larger diameter of pipe joints to pass through. In the example where the core layer comprises finger portions, expandability may be enhanced by ability of the fingers to spread apart.

As may be appreciated by those skilled in the art, the expandability of the conical section is dependent on the relative thickness and elasticity of the core layer compared to the sealing layer. As well, the various dimensions of the core layer relative to the seal itself, such as length of the finger portions relative to the length of the conical section, as well as the width of the finger projections, and the size of the gaps between the finger projections, are also factors. In one embodiment, the finger portions extend approximately ¾ the length of the conical section of the seal. These parameters may be varied by those skilled in the art to achieve different objectives of the seal and its intended use. An exemplary embodiment of the core layer is shown in FIGS. 6A to 6G, which includes dimensions and is substantially to scale.

In one embodiment, the core layer defines a plurality of openings. When the softer surface sealing layer material is cast around the core layer, the softer material fills the openings, and locks the two layers together. In one embodiment, where the core layer comprises multiple finger portions, each finger may define at least one opening, as is shown in the Figures.

The invention claimed is:

1. An elastomeric seal for a pipe passing through a rotating control device, said seal comprising a base portion adapted to be mounted within the rotary control device, a conical portion extending from the base portion, and defining a central pipe opening through both the base portion and the conical portion, wherein the conical portion comprises an elastomeric core layer and an elastomeric surface sealing layer, wherein the surface sealing layer and the base portion collectively envelop the core layer in the conical portion, wherein the surface sealing layer is softer than the core layer and defines a substantially cylindrical inner sealing surface and wherein the central pipe opening is defined by the substantially cylindrical inner sealing surface for sealing engagement with a pipe which slides through the central pipe opening.

2. The elastomeric seal of claim 1 wherein the core layer comprises a polyurethane having a hardness of between about 60 to about 90 on the Shore D durometer scale.

3. The elastomeric seal of claim 2 wherein the core layer polyurethane has a hardness of between about 70 to 80 on the Shore D durometer scale.

4. The elastomeric seal of claim 3 wherein the core layer polyurethane has a hardness of about 75 on the Shore D durometer scale.

5. The elastomeric seal of claim 2, wherein the sealing layer comprises a polyurethane having a hardness of between about 60 to 100 on the Shore A durometer scale.

6. The elastomeric seal of claim 5 wherein the sealing layer polyurethane has a hardness of between about 70 to about 90 on the Shore A durometer scale.

7. The elastomeric seal of claim 6 wherein the sealing layer polyurethane has a hardness of between about 75 to about 85 on the Shore A durometer scale.

8. The elastomeric seal of claim 7 wherein the sealing layer polyurethane has a hardness of about 82 on the Shore A durometer scale.

9. The elastomeric seal of claim 1, wherein the core layer comprises a plurality of finger portions spaced apart in a circumferential direction defined by the conical portion.

10. The elastomeric seal of claim 9 wherein the plurality of finger portions each define at least one anchor opening through which the sealing layer material may set.

11. The elastomeric seal of claim 1 wherein the base portion is integral with the core layer.

12. The elastomeric seal of claim 1 wherein the central pipe opening is also defined by a conical inner surface.

* * * * *